US012683477B2

(12) United States Patent
Chen et al.

(10) Patent No.: US 12,683,477 B2
(45) Date of Patent: Jul. 14, 2026

(54) POWER CONTROLLER AND POWER MANAGEMENT METHOD FOR MULTI-POWER CONVERSION SYSTEM

(71) Applicant: APh ePower Co., Ltd., Kaohsiung City (TW)

(72) Inventors: Syuan-Yi Chen, Kaohsiung City (TW); Ruei-Cing Lin, Kaohsiung City (TW); Kai-Bo Juan, Kaohsiung City (TW); Jui-Yang Huang, Kaohsiung City (TW); Hsiu-Hsien Su, Kaohsiung City (TW); Shang-Zeng Huang, Kaohsiung City (TW)

(73) Assignee: APh ePower Co., Ltd., Kaohsiung City (TW)

( * ) Notice: Subject to any disclaimer, the term of this patent is extended or adjusted under 35 U.S.C. 154(b) by 194 days.

(21) Appl. No.: 18/764,199

(22) Filed: Jul. 4, 2024

(65) Prior Publication Data

US 2025/0202333 A1 Jun. 19, 2025

(30) Foreign Application Priority Data

Dec. 13, 2023 (TW) ................................. 112148448

(51) Int. Cl.
*H02M 7/493* (2007.01)
*H02M 1/00* (2006.01)

(52) U.S. Cl.
CPC ....... *H02M 1/0025* (2021.05); *H02M 1/0019* (2021.05); *H02M 1/0022* (2021.05); *H02M 7/493* (2013.01)

(58) Field of Classification Search
CPC ............. H02M 1/0019; H02M 1/0022; H02M 1/0025; H02M 7/493
See application file for complete search history.

(56) References Cited

U.S. PATENT DOCUMENTS

| | | | | | |
|---|---|---|---|---|---|
| 2004/0201283 | A1* | 10/2004 | Pai | ............................ | H02J 3/40 |
| | | | | | 307/69 |
| 2019/0207391 | A1* | 7/2019 | Fazeli | ..................... | H02J 3/381 |
| 2023/0087529 | A1* | 3/2023 | Suzuki | .................... | H02J 3/381 |
| | | | | | 700/286 |

FOREIGN PATENT DOCUMENTS

| | | |
|---|---|---|
| CN | 105580261 | 5/2016 |
| TW | I656719 | 4/2019 |

OTHER PUBLICATIONS

Fei Deng et al., "An enhanced current sharing strategy for islanded ac microgrids based on adaptive virtual impedance regulation", International Journal of Electrical Power and Energy Systems, Aug. 3, 2021, pp. 1-13, vol. 134.

(Continued)

*Primary Examiner* — Gary L Laxton
(74) *Attorney, Agent, or Firm* — JCIPRNET

(57) ABSTRACT

Disclosed are a power controller and a power management method for a first power converter and a second power converter. The power controller generates an impedance compensation value according to a difference between a first load current value of the first power converter and a second load current value of the second power converter, and generates a voltage compensation value according to a difference between a load voltage value and a desired voltage value. The power controller controls the first power converter according to the first load current value, the impedance compensation value, the voltage compensation value, and an virtual impedance setting value of the first power converter, and controls the second power converter according to the second load current value, the impedance compensation value, the voltage compensation value and an virtual impedance setting value of the second power converter.

16 Claims, 4 Drawing Sheets

(56) References Cited

OTHER PUBLICATIONS

Carlos Andres Macana et al., "Adaptive synchronous reference frame virtual impedance controller for accurate power sharing in islanded ac-microgrids: A faster alternative to the conventional droop control", 2017 IEEE Energy Conversion Congress and Exposition, Oct. 1, 2017, pp. 3728-3735.

Fei Deng et al., "Review of Impedance-Reshaping-Based Power Sharing Strategies in Islanded AC Microgrids", IEEE Transactions on Smart Grid, Sep. 23, 2022, pp. 1692-1707, vol. 14, No. 3.

"Search Report of Europe Counterpart Application", issued on Feb. 27, 2025, p. 1-p. 10.

Hsuang-Chang Chiang et al., "Improved droop control method with precise current sharing and voltage regulation", IET Power Electronics, vol. 9, Iss. 4, Mar. 1, 2016, pp. 789-800.

Tuyen V.Vu et al., "Robust adaptive droop control for DC microgrids", Electric Power Systems Research, vol. 146, May 2017, pp. 95-106.

Sajjad Golshannavaz et al., "A generalized droop control approach for islanded DC microgrids hosting parallel-connected DERs", Sustainable Cities and Society, vol. 36, Jan. 2018, pp. 237-245.

Shahid Ullah et al., "A Distributed Secondary Control Strategy for Power Sharing and Voltage Regulation by Multiple Converters in DC Micro-grids", 2019 1st International Conference on Electrical, Control and Instrumentation Engineering (ICECIE), Nov. 2019, pp. 1-8.

Xinnna Tian et al., "An Improved Droop Control Strategy for Accurate Current Sharing and DC-Bus Voltage Compensation in DC Microgrid", The 16th IET International Conference on AC and DC Power Transmission (ACDC 2020), Jul. 2-3, 2020, pp. 1466-1473.

Zhili Xing et al., "Compensation Type Improved Droop Control Based Current Sharing MethodConverter", 2022 China Automation Congress (CAC), Nov. 25-27, 2022, pp. 1065-1070.

* cited by examiner

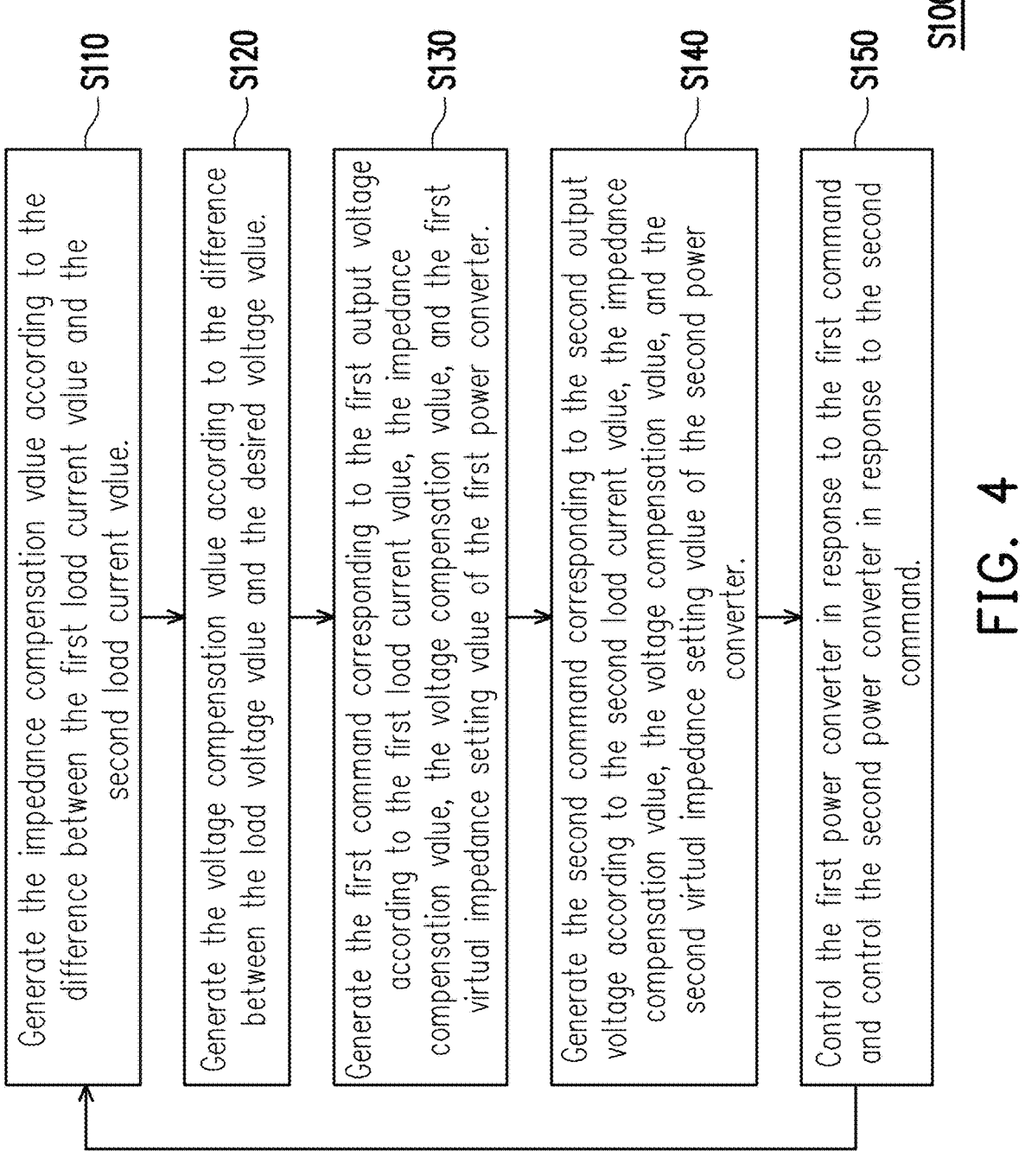

S110

Generate the impedance compensation value according to the difference between the first load current value and the second load current value.

S120

Generate the voltage compensation value according to the difference between the load voltage value and the desired voltage value.

S130

Generate the first command corresponding to the first output voltage according to the first load current value, the impedance compensation value, the voltage compensation value, and the first virtual impedance setting value of the first power converter.

S140

Generate the second command corresponding to the second output voltage according to the second load current value, the impedance compensation value, the voltage compensation value, and the second virtual impedance setting value of the second power converter.

S150

Control the first power converter in response to the first command and control the second power converter in response to the second command.

POWER CONTROLLER AND POWER MANAGEMENT METHOD FOR MULTI-POWER CONVERSION SYSTEM

CROSS-REFERENCE TO RELATED APPLICATION

This application claims the priority benefit of Taiwan application serial no. 112148448, filed on Dec. 13, 2023. The entirety of the above-mentioned patent application is hereby incorporated by reference herein and made a part of this specification.

BACKGROUND

Technical Field

The disclosure relates to a power controller and a power management method, and in particular to a power controller and a power management method for a multi-power conversion system.

Description of Related Art

Generally, in high-power conversion applications, a single power converter is utilized. However, in response to greater load currents, the design of power elements of such power converters costs more. In addition, the performance of the power converter easily degrades during long-term operation due to the stress of greater load currents.

Thus, in high-power conversion applications, multiple power converters may be utilized to share the load currents. However, the elements of the power converters may be inconsistent in design. Thus, the load currents shared by the power converters may also be inconsistent. As a result, one of the power converters bears more load currents, thereby being degraded or damaged earlier than other power converters.

It may be seen that how to enable multiple power converters to evenly share load currents is one of the focuses of research for those skilled in the art.

SUMMARY

The disclosure provides a power controller and a power management method to make improvements for multiple power converters in a multi-power conversion system to share load current equally.

A power controller of the disclosure is for a multi-power conversion system. The multi-power conversion system supplies power to a load. The multi-power conversion system at least includes a first power converter and a second power converter. The power controller includes a first compensation circuit, a second compensation circuit, a first operation circuit, a second operation circuit, and a control circuit. The first compensation circuit receives a first load current value from the first power converter and a second load current value from the second power converter, and generates an impedance compensation value according to a difference between the first load current value and the second load current value. The second compensation circuit receives a load voltage value from the load and generates a voltage compensation value according to a difference between the load voltage value and a desired voltage value. The first operation circuit is coupled to the first compensation circuit and the second compensation circuit. The first operation circuit generates a first command corresponding to a first output voltage according to the first load current value, the impedance compensation value, the voltage compensation value, and a first virtual impedance setting value of the first power converter. The second operation circuit is coupled to the first compensation circuit and the second compensation circuit. The second operation circuit generates a second command corresponding to a second output voltage according to the second load current value, the impedance compensation value, the voltage compensation value, and a second virtual impedance setting value of the second power converter. The control circuit is coupled to the first operation circuit and the second operation circuit. The control circuit controls the first power converter in response to the first command and controls the second power converter in response to the second command.

A power management method of the disclosure is for a multi-power conversion system. The multi-power conversion system supplies power to a load. The multi-power conversion system at least includes a first power converter and a second power converter. The power management method includes the following steps. A first load current value is received from the first power converter, and a second load current value is received from the second power converter. An impedance compensation value is generated according to a difference between the first load current value and the second load current value. A load voltage value is received from the load and a voltage compensation value is generated according to a difference between the load voltage value and a desired voltage value. A first command corresponding to a first output voltage is generated according to the first load current value, the impedance compensation value, the voltage compensation value, and a first impedance value of the first power converter. A second command corresponding to a second output voltage is generated according to the second load current value, the impedance compensation value, the voltage compensation value, and a second impedance value of the second power converter. The first power converter is controlled in response to the first command and the second power converter is controlled in response to the second command.

Based on the above, the first power converter operates in response to the first command. The second power converter operates in response to the second command. It should be noted that the first command and the second command are related to the difference between the first load current value and the second load current value, and the difference between the load voltage value and the desired voltage value. Thus, output voltages provided by the first power converter and the second power converter are corrected by the impedance compensation value and the voltage compensation value. As a result, the first load current value and the second load current value are close to each other. This way, the first power converter and the second power converter share the load current equally.

BRIEF DESCRIPTION OF THE DRAWINGS

FIG. 4 is a flowchart of a power management method illustrated according to an embodiment of the disclosure.

DESCRIPTION OF THE EMBODIMENTS

Figure 1:
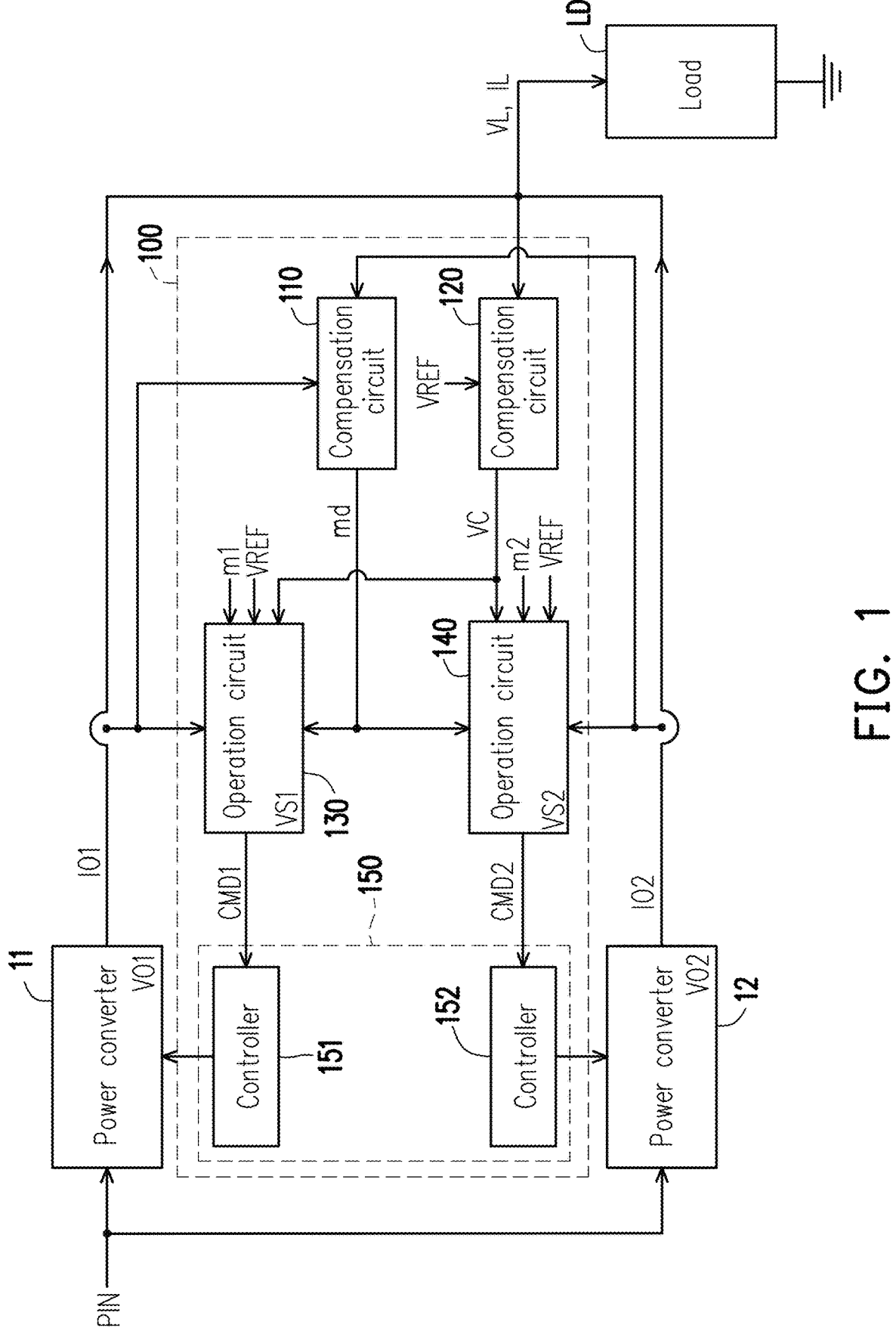
FIG. 1 is a schematic diagram of a power controller illustrated according to an embodiment of the disclosure.

Some embodiments of the disclosure will be described in detail below with reference to the drawings. For the reference numerals cited in the following description, when the same reference numerals appear in different drawings, the reference numerals will be regarded as referring to the same or similar elements. The embodiments are only a part of the disclosure and do not disclose all possible implementations of the disclosure. More specifically, the embodiments are merely examples in the claims of the disclosure.

Please refer to FIG. 1, which is a schematic diagram of a power controller illustrated according to an embodiment of the disclosure. In this embodiment, a power controller 100 is for a multi-power conversion system. The multi-power conversion system supplies power to a load LD. The multi-power conversion system at least includes power converters 11 and 12. The power converters 11 and 12 may jointly provide a load voltage value VL and a load current value IL to the load LD. The power converter 11 receives an input power PIN, generates an output voltage value VO1 according to the input power PIN, and generates a load current value IO1 according to the output voltage value VO1 and a virtual impedance setting value m1. The power converter 12 receives the input power PIN, generates an output voltage value VO2 according to the input power PIN, and generates a load current value IO2 according to the output voltage value VO2 and a virtual impedance setting value m2. The load current value IL received by the load LD is equal to the sum of the load current value IO1 and the load current value IO2. In this embodiment, the virtual impedance setting value m1 is used to compensate for an internal impedance of the power converter 11. The virtual impedance setting value m2 is used to compensate for an internal impedance of the power converter 12.

It should be noted that the design of the power converter 11 may be different from the design of the power converter 12. For example, the internal impedance of the power converter 11 is different from the internal impedance of the power converter 12. Thus, the load current value IO1 is obviously different from the load current value IO2, and thus, the power converters 11 and 12 share the load current values IO1 and IO2 equally. For example, when the load current value IO1 is obviously greater than the load current value IO2, the performance of the power converter 11 easily degrades after long-term usage due to a stress of the greater load current.

Thus, during the operation of both of the power converters 11 and 12, the load current value IO1 must be close to the load current value IO2.

In this embodiment, the power controller 100 includes compensation circuits 110 and 120, operation circuits 130 and 140, and a control circuit 150. The compensation circuit 110 receives the load current value IO1 from the power converter 11 and the load current value IO2 from the second power converter 12, and generates an impedance compensation value md according to a difference between the load current value IO1 and the load current value IO2. The compensation circuit 120 receives the load voltage value VL from the load LD and generates a voltage compensation value VC according to a difference between the load voltage value VL and a desired voltage value VREF.

In this embodiment, the operation circuit 130 is coupled to the compensation circuits 110 and 120. The operation circuit 130 generates a first command CMD1 corresponding to an output voltage VS1 according to the load current value IO1, the impedance compensation value md, the voltage compensation value VC, and a virtual impedance setting value m1 of the power converter 11. The operation circuit 140 is coupled to the compensation circuits 110 and 120. The operation circuit 140 generates a second command CMD2 corresponding to an output voltage VS2 according to the load current value IO2, the impedance compensation value md, the voltage compensation value VC, and a virtual impedance setting value m2 of the power converter 12.

The control circuit 150 is coupled to the operation circuits 130 and 140 and the power converters 11 and 12. The control circuit 150 controls the power converter 11 in response to the first command CMD1 and controls the power converter 12 in response to the second command CMD2.

In this embodiment, the power converter 11 operates in response to the first command CMD1. The power converter 12 operates in response to the second command CMD2. It is worth mentioning that the first command CMD1 and the second command CMD2 are related to the difference between the load current value IO1 and the load current value IO2, and the difference between the load voltage value VL and the desired voltage value VREF. Thus, output voltages provided by the power converters 11 and 12 are corrected. As a result, the load current value IO1 and the load current value IO2 are close to each other. This way, the power converters 11 and 12 share the load current equally.

For example, the compensation circuit 110 may perform a proportional-integral-derivative control (PID) operation on the difference between the load current values IO1 and IO2 to generate an error value (although the disclosure is not limited thereto), and use the error value as the impedance compensation value md. For example, the compensation circuit 110 may obtain the impedance compensation value md according to Formulas (1) and (2).

$$e_I = IO1 - IO2 \qquad \text{Formula (1)}$$

$$md = k_p(e_I) + k_I \int_0^t (e_I)dt + k_d(\dot{e}_I) \qquad \text{Formula (2)}$$

In Formulas (1) and (2), "eI" is the difference between the load current values IO1 and IO2. "kp" is a proportional gain. "kI" is an integral gain. "kd" is a derivative gain. The compensation circuit 110 subtracts the load current value IO2 from the load current value IO1 to generate the difference eI and obtains the impedance compensation value md through the PID operation by using Formula (2). The impedance compensation value md is a real number.

The desired voltage value VREF is a target voltage value expected to be received by the load LD. The load voltage value VL is as shown in Formula (3). That is, the load voltage value VL decreases due to the load current values IO1 and IO2 as well as the virtual impedance setting values m1 and m2. Thus, the load voltage value VL needs to be compensated.

$$VL = VO1 - IO1 \times m1 = VO2 - IO2 \times m2 \qquad \text{Formula (3)}$$

In this embodiment, the compensation circuit 120 subtracts the load voltage value VL from the desired voltage value VREF to generate the voltage compensation value VC. The output voltage VO1 of the power converter 11 and the output voltage VO2 of the power converter 12 are raised according to the voltage compensation value VC. The voltage compensation value VC is a real number.

In this embodiment, the control circuit 150 includes controllers 151 and 152. The controller 151 is coupled to the operation circuit 130 and the power converter 11. The controller 151 receives the first command CMD1 corresponding to the output voltage VS1 and uses the first command CMD1 to control the power converter 11. The controller 152 is coupled to the operation circuits 110 and 120 and the power converter 12. The controller 152 receives the second command CMD2 corresponding to the output voltage VS2 and uses the second command CMD2 to control the power converter 12. In this embodiment, the output voltage VS1 is a voltage function related to the voltage compensation value VC and the impedance compensation value md. The output voltage VS2 is a voltage function related to the voltage compensation value VC and the impedance compensation value md. Thus, the control circuit 150 changes a switch control signal of the power converter 11 and adjusts the impedance setting value in response to the first command CMD1, and changes a switch control signal of the power converter 12 and adjusts the impedance setting value in response to the second command CMD2. In addition, the control circuit 150 adjusts a voltage value of the output voltage VO1 of the power converter 11 in response to the first command CMD1, and adjusts a voltage value of the output voltage VO2 of the power converter 12 in response to the second command CMD2.

In some embodiments, the number of power converters may be more than two. The disclosure is not limited by the number of power converters.

Figure 2:
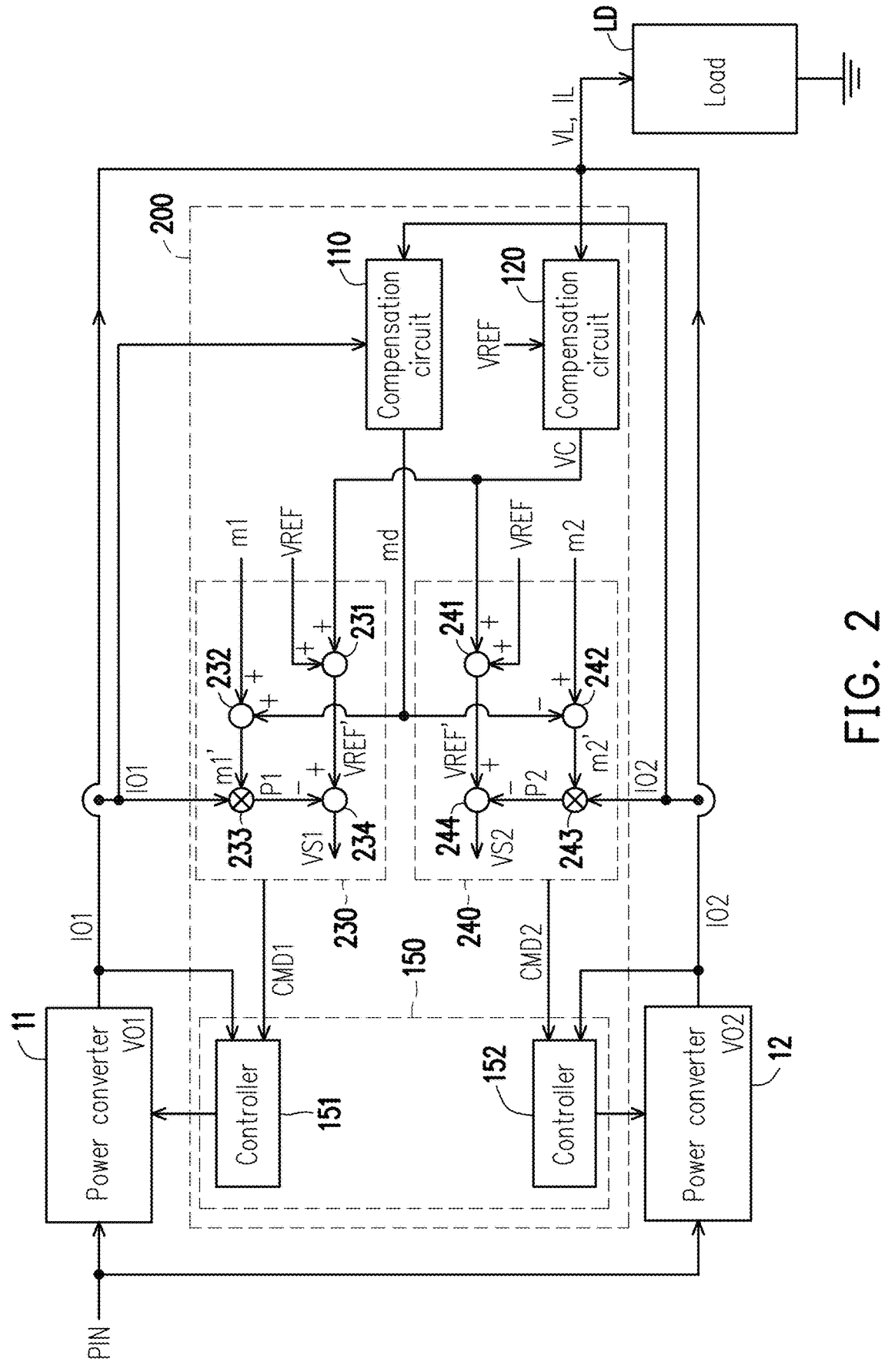
FIG. 2 is a schematic diagram of a power controller illustrated according to another embodiment of the disclosure.

Please refer to FIG. 2, which is a schematic diagram of a power controller illustrated according to another embodiment of the disclosure. In this embodiment, a power controller 200 is for a multi-power conversion system. The multi-power conversion system at least includes power converters 11 and 12. The power controller 200 includes compensation circuits 110 and 120, operation circuits 230 and 240, and a control circuit 150. The operations of the compensation circuits 110 and 120 and the control circuit 150 have been clearly described in the embodiment of FIG. 1, and are not repeated here.

In this embodiment, an operation circuit 230 adds a desired voltage value VREF to a voltage compensation value VC to generate an adjusted voltage value VREF', and adds an impedance compensation value md to a virtual impedance setting value m1 to generate an adjusted impedance setting value m1'. The operation circuit 230 multiplies a load current value IO1 by the adjusted impedance setting value m1' to generate a first product P1. Next, the operation circuit 230 subtracts the first product P1 from the adjusted voltage value VREF' to generate a voltage value of an output voltage VS1 for the power converter 11. Thus, a function of the output voltage VS1 is as shown in Formula (4).

$$VS1 = VREF + VC - IO1 \times (m1 + md) \qquad \text{Formula (4)}$$

In this exemplary embodiment, the operation circuit 230 includes adders 231 and 232, a multiplier 233, and a subtractor 234. The adder 231 is coupled to the compensation circuit 120. The adder 231 adds the desired voltage value VREF to the voltage compensation value VC to generate the adjusted voltage value VREF'. The adder 232 is coupled to the compensation circuit 110. The adder 232 adds the impedance compensation value md to the virtual impedance setting value m1 to generate the adjusted impedance setting value m1'. The multiplier 233 is coupled to the adder 232. The multiplier 233 multiplies the load current value IO1 by the adjusted impedance setting value m1' to generate the first product P1. The multiplier 233 may obtain the load current value IO1 through inductive coupling (although this disclosure is not limited thereto). The subtractor 234 is coupled to the adder 231 and the multiplier 233. The subtractor 234 subtracts the first product P1 from the adjusted voltage value VREF' to generate the voltage value of the output voltage VS1.

In this embodiment, the operation circuit 240 adds the desired voltage value VREF to the voltage compensation value VC to generate the adjusted voltage value VREF', and subtracts the impedance compensation value md from a virtual impedance setting value m2 to generate an adjusted impedance setting value m2'. The operation circuit 240 multiplies a load current value IO2 by the adjusted impedance setting value m2' to generate a second product P2. Next, the operation circuit 240 subtracts the second product P2 from the adjusted voltage value VREF' to generate a voltage value of an output voltage VS2 for the power converter 12. Thus, a function of the output voltage VS2 is as shown in Formula (5).

$$VS2 = VREF + VC - IO2 \times (m2 + md) \qquad \text{Formula (5)}$$

In this exemplary embodiment, the operation circuit 240 includes an adder 241, subtractors 242 and 244, and a multiplier 243. The adder 241 is coupled to the compensation circuit 120. The adder 241 adds the desired voltage value VREF to the voltage compensation value VC to generate the adjusted voltage value VREF'. The subtractor 242 is coupled to the compensation circuit 110. The subtractor 242 subtracts the impedance compensation value md from the virtual impedance setting value m2 to generate the adjusted impedance setting value m2'. The multiplier 243 is coupled to the subtractor 242. The multiplier 243 multiplies the load current value IO2 by the adjusted impedance setting value m2' to generate the second product P2. The multiplier 243 may obtain the load current value IO2 through inductive coupling (although this disclosure is not limited thereto). The subtractor 244 is coupled to the adder 241 and the multiplier 243. The subtractor 244 subtracts the second product P2 from the adjusted voltage value VREF' to generate the voltage value of the output voltage VS2.

Figure 3:
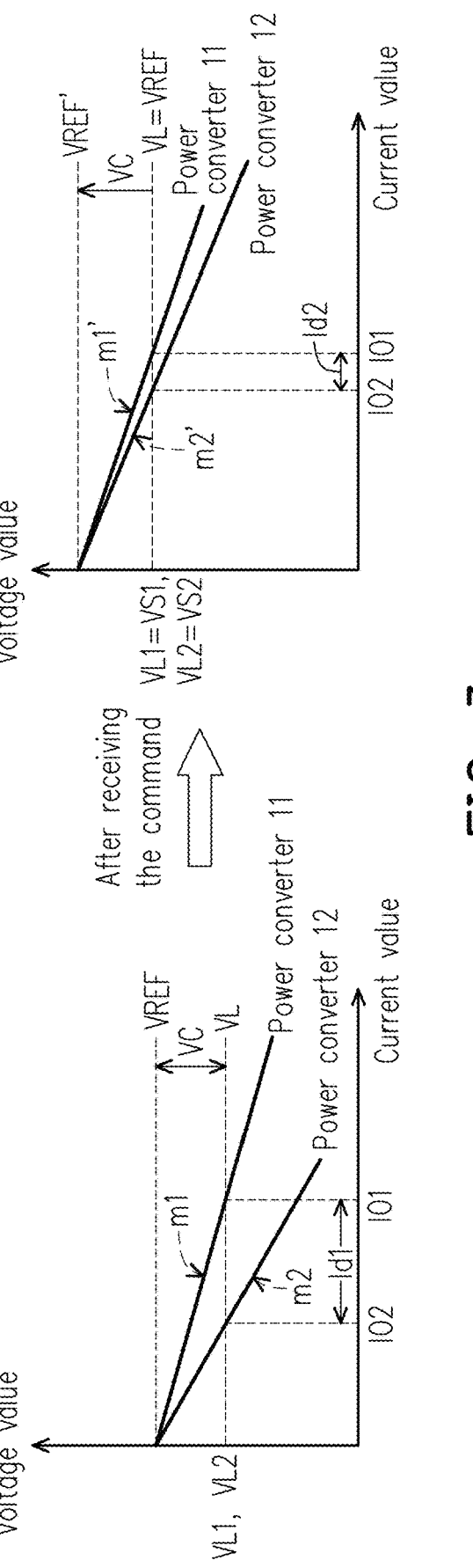
FIG. 3 is a schematic diagram of a load voltage and a load current illustrated according to an embodiment of the disclosure.

Please refer to FIGS. 2 and 3 at the same time. FIG. 3 is a schematic diagram of a load voltage and a load current illustrated according to an embodiment of the disclosure. FIG. 3 shows a load voltage VL1 and the load current value IO1 provided by the power converter 11, and a load voltage VL2 and the load current value IO2 provided by the power converter 12. The load voltages VL1 and VL2 may be determined based on Formula (3). In other words, a voltage value of the load voltage VL1 decreases due to the load current value IO1 and the virtual impedance setting value m1. A voltage value of the load voltage VL2 also decreases due to the load current value IO2 and the virtual impedance setting value m2. In addition, the amount of decrease in the voltage value of the load voltage VL1 is determined by the virtual impedance setting value m1. That is, a slope of the load voltage VL1 may be changed through the virtual impedance setting value m1. The amount of decrease in the voltage value of the load voltage VL2 is determined by the virtual impedance setting value m2. That is, a slope of the load voltage VL2 may be changed through the virtual impedance setting value m2. In this exemplary embodiment, the virtual impedance setting value m1 is less than the virtual impedance setting value m2. Thus, when the voltage values of the load voltages VL1 and VL2 are equal to the load voltage value VL, the load current value IO2 is greater than the load current value IO1. There is a difference Id1 between the load current value IO2 and the load current value IO1. The difference Id1 must be reduced. In addition, it should also be noted that when the voltage values of the load voltages VL1 and VL2 are equal to the load voltage value VL, the load voltage value VL is less than the desired voltage value VREF expected by the load LD. Thus, the load voltage value VL is insufficient.

After receiving the first command CMD1 and the second command CMD2, the control circuit 150 controls the power converter 11 in response to the first command CMD1 and controls the power converter 12 in response to the second command CMD2. Therefore, the load voltage VL1 provided by the power converter 11 is raised based on the voltage compensation value VC. The impedance compensation value md is added to the virtual impedance setting value m1 of the power converter 11. Thus, the adjusted impedance setting value m1' is generated. The load voltage VL2 provided by the power converter 12 is also raised based on the voltage compensation value VC. The impedance compensation value md is subtracted from the virtual impedance setting value m2 of the power converter 12. Thus, the adjusted impedance setting value m2' is generated. The load voltage VL1 is equal to the output voltage VS1. The load voltage VL2 is equal to the output voltage VS2.

Thus, when the voltage values of the load voltages VL1 and VL2 are equal to the load voltage value VL, the load voltage value VL is basically equal to the desired voltage value VREF. In addition, the amount of decrease in the voltage value of the load voltage VL1 is determined by the adjusted impedance setting value m1'. That is, the slope of the load voltage VL1 may be changed through the adjusted impedance setting value m1'. The amount of decrease in the voltage value of the load voltage VL2 is determined by the adjusted impedance setting value m2'. That is, the slope of the load voltage VL2 may be changed through the adjusted impedance setting value m2'. Thus, there is a difference Id2 between the load current value IO2 and the load current value IO1. The difference Id2 is less than the difference Id1. Thus, after the first command CMD1 and the second command CMD2 are received, the load current value IO2 and the load current value IO1 are close to each other.

In this embodiment, the controller 151 receives the load voltage VL1 output by the power converter 11 to confirm whether the load voltage VL1 is consistent with the output voltage VS1. The controller 152 receives the load voltage VL2 output by the power converter 12 to confirm whether the load voltage VL2 is consistent with the output voltage VS2.

Please refer to FIGS. 1 and 4 at the same time. FIG. 4 is a flowchart of a power management method illustrated according to an embodiment of the disclosure. In this embodiment, a power management method S100 is applicable a multi-power conversion system. The power management method S100 may be performed by, for example, the power controller 100. The power management method S100 includes Steps S110 to S150. In Step S110, the compensation circuit 110 generates the impedance compensation value md according to the difference between the load current value IO1 from the power converter 11 (i.e., the first power converter) and the load current value IO2 from the power converter 12 (i.e., the second power converter). In Step S120, the compensation circuit 120 generates the voltage compensation value VC according to the difference between the load voltage value VL and the desired voltage value VREF. In this embodiment, Steps S110 and S120 may be performed at the same time.

In Step S130, the operation circuit 130 generates the first command CMD1 corresponding to the output voltage VS1 according to the load current value IO1, the impedance compensation value md, the voltage compensation value VC, and the virtual impedance setting value m1 of the power converter 11. In Step S140, the operation circuit 140 generates the second command CMD2 corresponding to the output voltage VS2 according to the load current value IO2, the impedance compensation value md, the voltage compensation value VC, and the virtual impedance setting value m2 of the power converter 12. In this embodiment, Steps S130 and S140 may be performed at the same time.

In Step S150, the control circuit 150 controls the power converter 11 in response to the first command CMD1 and controls the power converter 12 in response to the second command CMD2. After Step S150 is completed, the operation of the power management method S100 returns to Step S110.

The implementation details of Steps S110 to S150 have been clearly described in the embodiments of FIGS. 1 to 3 and are not repeated here.

In summary, the first power converter operates in response to the first command. The second power converter operates in response to the second command. The first command and the second command are respectively related to the difference between the first load current value and the second load current value, and the difference between the load voltage value and the desired voltage value. Thus, the outputs of the first power converter and the second power converter are corrected by the impedance compensation value and the voltage compensation value. As a result, the first load current value of the first power converter and the second load current value of the second power converter are close to each other. This way, the first power converter and the second power converter share the load current equally.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A power controller for a multi-power conversion system, wherein the multi-power conversion system supplies power to a load, and the multi-power conversion system at least comprises a first power converter and a second power converter, the power controller comprising:

a first compensation circuit, configured to receive a first load current value from the first power converter and a second load current value from the second power converter, and generate an impedance compensation value according to a difference between the first load current value and the second load current value;

a second compensation circuit, configured to receive a load voltage value from the load and generate a voltage compensation value according to a difference between the load voltage value and a desired voltage value;

a first operation circuit, coupled to the first compensation circuit and the second compensation circuit, and configured to generate a first command corresponding to a first output voltage according to the first load current value, the impedance compensation value, the voltage compensation value, and a first virtual impedance setting value of the first power converter;

a second operation circuit, coupled to the first compensation circuit and the second compensation circuit, and configured to generate a second command corresponding to a second output voltage according to the second load current value, the impedance compensation value, the voltage compensation value, and a second virtual impedance setting value of the second power converter; and a control circuit, coupled to the first operation circuit and the second operation circuit, and configured to control the first power converter in response to the first command and control the second power converter in response to the second command.

2. The power controller according to claim 1, wherein the first compensation circuit performs a proportional-integral-derivative control operation on the difference between the first load current value and the second load current value to generate an error value, and uses the error value as the impedance compensation value.

3. The power controller according to claim 1, wherein the second compensation circuit subtracts the load voltage value from the desired voltage value to generate the voltage compensation value.

4. The power controller according to claim 1, wherein a first output voltage value of the first power converter and a second output voltage value of the second power converter are raised according to the voltage compensation value.

5. The power controller according to claim 1, wherein the control circuit changes the first virtual impedance setting value in response to the first command and changes the second virtual impedance setting value in response to the second command.

6. The power controller according to claim 1, wherein the first operation circuit adds the desired voltage value to the voltage compensation value to generate an adjusted voltage value, adds the impedance compensation value to the first virtual impedance setting value to generate a first adjusted impedance setting value, multiplies the first load current value by the first adjusted impedance setting value to generate a first product, and subtracts the first product from the adjusted voltage value to generate a voltage value of the first output voltage.

7. The power controller according to claim 6, wherein the second operation circuit adds the desired voltage value to the voltage compensation value to generate the adjusted voltage value, subtracts the impedance compensation value from the second virtual impedance setting value to generate a second adjusted impedance setting value, multiplies the second load current value by the second adjusted impedance setting value to generate a second product, and subtracts the second product from the adjusted voltage value to generate a voltage value of the second output voltage.

8. The power controller according to claim 1, wherein the first operation circuit comprises:

a first adder, coupled to the second compensation circuit and configured to add the desired voltage value to the voltage compensation value to generate an adjusted voltage value;

a second adder, coupled to the first compensation circuit and configured to add the impedance compensation value to the first virtual impedance setting value to generate a first adjusted impedance setting value;

a first multiplier, coupled to the second adder and configured to multiply the first load current value by the first adjusted impedance setting value to generate a first product; and a first subtractor, coupled to the first adder and the first multiplier, and configured to subtract the first product from the adjusted voltage value to generate a voltage value of the first output voltage.

9. The power controller according to claim 8, wherein the second operation circuit comprises:

a third adder, coupled to the second compensation circuit and configured to add the desired voltage value to the voltage compensation value to generate the adjusted voltage value;

a second subtractor, coupled to the first compensation circuit and configured to subtract the impedance compensation value from the second virtual impedance setting value to generate a second adjusted impedance setting value;

a second multiplier, coupled to the second subtractor and configured to multiply the second load current value by the second adjusted impedance setting value to generate a second product; and a third subtractor, coupled to the third adder and the second multiplier, and configured to subtract the second product from the adjusted voltage value to generate a voltage value of the second output voltage.

10. A power management method for a multi-power conversion system, wherein the multi-power conversion system supplies power to a load, and the multi-power conversion system at least comprises a first power converter and a second power converter, the power management method comprising:

receiving a first load current value from the first power converter and a second load current value from the second power converter, and generating an impedance compensation value according to a difference between the first load current value and the second load current value;

receiving a load voltage value from the load and generating a voltage compensation value according to a difference between the load voltage value and a desired voltage value;

generating a first command corresponding to a first output voltage according to the first load current value, the impedance compensation value, the voltage compensation value, and a first virtual impedance setting value of the first power converter;

generating a second command corresponding to a second output voltage according to the second load current value, the impedance compensation value, the voltage compensation value, and a second virtual impedance setting value of the second power converter; and controlling the first power converter in response to the first command and controlling the second power converter in response to the second command.

11. The power management method according to claim 10, wherein generating the impedance compensation value according to the difference between the first load current value and the second load current value comprises:

performing a proportional-integral-derivative control operation on the difference between the first load current value and the second load current value to generate an error value, and uses the error value as the impedance compensation value.

12. The power management method according to claim 10, wherein generating the voltage compensation value according to the difference between the load voltage value and the desired voltage value comprises:

subtracting the load voltage value from the desired voltage value to generate the voltage compensation value.

13. The power management method according to claim 10, wherein controlling the first power converter in response to the first command and controlling the second power converter in response to the second command comprises:

raising a first output voltage value of the first power converter and a second output voltage value of the second power converter according to the voltage compensation value.

14. The power management method according to claim 10, wherein controlling the first power converter in response to the first command and controlling the second power converter in response to the second command comprises:

changing the first virtual impedance setting value with the first power converter in response to the first command; and changing the second virtual impedance setting value with the second power converter in response to the second command.

15. The power management method according to claim 10, wherein generating the first command corresponding to the first output voltage according to the first load current value, the impedance compensation value, the voltage compensation value, and the first virtual impedance setting value of the first power converter comprises:

adding the desired voltage value to the voltage compensation value to generate an adjusted voltage value;

adding the impedance compensation value to the first virtual impedance setting value to generate a first adjusted impedance setting value;

multiplying the first load current value by the first adjusted impedance setting value to generate a first product; and subtracting the first product from the adjusted voltage value to generate a voltage value of the first output voltage.

16. The power management method according to claim 15, wherein generating the second command corresponding to the second output voltage according to the second load current value, the impedance compensation value, the voltage compensation value, and the second virtual impedance setting value of the second power converter comprises:

adding the desired voltage value to the voltage compensation value to generate the adjusted voltage value;

subtracting the impedance compensation value from the second virtual impedance setting value to generate a second adjusted impedance setting value;

multiplying the second load current value by the second adjusted impedance setting value to generate a second product; and subtracting the second product from the adjusted voltage value to generate a voltage value of the second output voltage.

* * * * *